US011218549B2

(12) United States Patent
Slupik et al.

(10) Patent No.: US 11,218,549 B2
(45) Date of Patent: *Jan. 4, 2022

(54) SYNCHRONIZATION OF CONTROLLER STATES IN A DISTRIBUTED CONTROL SYSTEM, INCLUDING SYNCHRONIZATION ACROSS LUMINAIRE NODES HAVING CONTROLLERS

(71) Applicant: Silvair Sp. z o.o., Cracow (PL)

(72) Inventors: Szymon Slupik, Cracow (PL); Maciej Witalinski, Jaworzno (PL)

(73) Assignee: Silvair Sp. z o.o., Cracow (PL)

( * ) Notice: Subject to any disclaimer, the term of this patent is extended or adjusted under 35 U.S.C. 154(b) by 23 days.

This patent is subject to a terminal disclaimer.

(21) Appl. No.: 16/983,906

(22) Filed: Aug. 3, 2020

(65) Prior Publication Data

US 2020/0366519 A1 Nov. 19, 2020

Related U.S. Application Data

(63) Continuation of application No. 15/991,909, filed on May 29, 2018, now Pat. No. 10,797,905.

(51) Int. Cl.
*H04L 29/08* (2006.01)
*H04L 12/28* (2006.01)
*H05B 47/11* (2020.01)
(Continued)

(52) U.S. Cl.
CPC ........ *H04L 67/125* (2013.01); *H04L 12/2838* (2013.01); *H05B 47/11* (2020.01); *H05B 47/18* (2020.01); *H05B 47/19* (2020.01)

(58) Field of Classification Search
CPC ............ H04W 48/18; H04W 72/1263; H04W 84/12; H04W 88/06; H04W 88/16;
(Continued)

(56) References Cited

FOREIGN PATENT DOCUMENTS

WO 2015049412 A1 4/2015
WO WO-2015049412 A1 * 4/2015 ........... H05B 47/175
(Continued)

OTHER PUBLICATIONS

International Search Report, PCT/US2019/033669, dated Aug. 29, 2019.
(Continued)

*Primary Examiner* — Hardikkumar D Patel
(74) *Attorney, Agent, or Firm* — McGeary Cukor, LLC; Kenneth Ottesen; Jason Paul DeMont

(57) ABSTRACT

A distributed control system, comprising a data network with a plurality of controller nodes that maintain and share their internal states with one another. The controller nodes can be luminaires that are capable of controlling the ambient lighting within a building area. There are one or more ambient light sensors within the data network for sensing and reporting the ambient light level. The controller luminaire nodes are members of a defined group of nodes that share, with one another, information for synchronizing their internal states, based in part on the ambient light levels that the one or more sensors are reporting. Meanwhile, each luminaire node also continually updates its own internal state based on the synchronization data received from the other nodes.

20 Claims, 11 Drawing Sheets

(51) Int. Cl.
*H05B 47/18* (2020.01)
*H05B 47/19* (2020.01)

(58) Field of Classification Search
CPC ..... H04W 92/10; H04W 76/02; H04W 48/12; H04W 76/021; H04W 48/16; H04W 28/06; H04W 74/0808; H04W 4/02; H04W 12/08; H04W 72/04; H04W 72/12; H04L 67/18; H04L 69/04; H04L 5/0057; H04L 5/0073; H04L 29/06; H04L 63/08; H04B 7/0452; H04J 11/0053; G07F 17/32; G07F 17/3225; G07F 17/3237; G07F 17/3241; H04N 3/40; H04N 5/2256; H04N 9/04557; H04N 9/0451; G03B 21/40; H01L 27/1485; H01L 27/14868; H01L 27/14843; G01S 17/10; G01S 7/483; G01S 17/89
See application file for complete search history.

(56) References Cited

FOREIGN PATENT DOCUMENTS

| WO | 2015189118 | A1 | | 12/2015 | |
| WO | WO-2015189118 | A1 | * | 12/2015 | ............. H05B 47/11 |

OTHER PUBLICATIONS

Written Opinion of the International Search Authority, PCT/US2019/033669, dated Aug. 29, 2019.
Office action, U.S. Appl. No. 15/991,909, dated Sep. 26, 2019.
Office action, U.S. Appl. No. 15/991,909, dated Mar. 13, 2020.
Notice of Allowance, U.S. Appl. No. 15/991,909, dated Jun. 24, 2020.
International Preliminary Report on Patentability, PCT/US2019/033669, dated Dec. 1, 2020.

* cited by examiner

SYNCHRONIZATION OF CONTROLLER STATES IN A DISTRIBUTED CONTROL SYSTEM, INCLUDING SYNCHRONIZATION ACROSS LUMINAIRE NODES HAVING CONTROLLERS

CROSS REFERENCE TO RELATED APPLICATIONS

This application is related to "Synchronization of Controller States in a Distributed Control System," U.S. application Ser. No. 15/991,909, incorporated by reference herein.

FIELD OF THE INVENTION

The present invention relates to building automation and control in general, and, more particularly, to synchronization of internal controller states across processors in a distributed control system.

BACKGROUND OF THE INVENTION

"Commercial building automation," or "commercial automation," refers to the use of computer and information technology to control commercial building systems, such as lighting, HVAC, audio-visual, smoke detection, security, and shading, among others. Using specialized hardware and control logic, building devices can monitor their environment and can be controlled automatically. Although commercial automation has been available at some level of sophistication for some time, it steadily becomes more practical, from both a technological and cost perspective.

A sophisticated commercial automation and control system might include sensors (e.g., of temperature, of light, of motion, etc.), controllers (e.g., a general-purpose personal computer, a dedicated automation controller, etc.), and actuators or actors (e.g., motorized valves, switches, etc.). The system might also include a human-machine interface device that enables an occupant of the building to interact with the system. The interface can be a specialized terminal or an application ("app") running on a smartphone or tablet computer. The various system devices communicate over dedicated wiring, or over a wired network, or wirelessly, using one or more protocols.

Lighting automation and control systems now exist in which luminaires that comprise sensors, lamps, and control logic are networked together, in what is sometimes referred to as "connected lighting" or networked "smart lighting." In such a network, the sensors that are associated with the luminaires collect data about the local environment, such as data related to ambient lighting in the vicinity of the luminaires. The networked luminaires communicate with each other, in some cases sharing the sensor data, and adjust the light output of the lamps via the control logic, with some level of coordination across the networked luminaires.

FIG. 1 depicts building control system 100 in the prior art. System 100 comprises: sensor nodes 101-1 through 101-G, wherein G is a positive integer; actor nodes 102-1 through 102-H, wherein H is a positive integer; and controller 110. The aforementioned elements are logically interconnected as shown and are physically interconnected, either wirelessly or via wired connections.

Sensor nodes 101-1 through 101-G include one or more of: motion sensors, occupancy sensors, temperature sensors, light sensors, and air quality sensors. Actor nodes 102-1 through 102-H are building devices that include one or more of: lamps, possibly with adjustable brightness and/or color; window blinds that can be opened and closed; and HVAC (heating, ventilation, and air conditioning) systems. Using such sensor and actor nodes, building control system 100 is capable of triggering and acting on certain conditions as a function of sensor readings, such as turning on lights when ambient light is low or when motion is detected, controlling HVAC systems in response to temperature variations, and so forth. Controller 110 coordinates and executes the actions to be taken by one or more of the actor nodes, based on i) the input signals received from one or more of the sensor nodes and ii) one or more memorized states.

SUMMARY OF THE INVENTION

Automation and control systems also exist in which a central controller is not present. In some of these distributed control systems, sensor nodes are configured to provide data directly to actor nodes, wherein the data pertains to one or more physical conditions that are being monitored by the sensors. When the actor nodes receive the sensor data, the actor nodes can use the sensor data in order to control units that are configured to perform one or more functions, such as lamps that are configured to provide light to an area within a building.

Distributed control systems have some advantages over centralized control systems, including in some cases the elimination of a single point of failure and the reduction of processor load. Furthermore, technologies such as Bluetooth mesh networking can enable a single, published message to be processed by more than one network node; for example, each sensor data message can be acted upon by more than one node. However, in mesh networks the communication between the sensor nodes and actor nodes, for example, is not necessarily reliable, in that one or more of the actor nodes might not receive some of the messages containing the sensor data.

To compound problems, certain control systems that are based on sequential logic, such as some lighting control systems, rely on the internal states of each of the controllers of the actor nodes being maintained correctly with respect to one another. Consequently, one or more output values from the controllers, or from the controller logic, of the actor nodes might be out of synch with one another and, consequently, can cause problems with performing the control functions of the automation and control system.

The present invention enables, in a data network of a distributed control system, a plurality of controller nodes to maintain and share their internal states with one another, thereby promoting more effective control of the physical condition being monitored and controlled, such as the ambient light level. In accordance with the illustrative embodiment of the present invention, the controller nodes are luminaires that are capable of controlling the ambient lighting within a building area. There are also one or more ambient light sensors within the data network for sensing and reporting the ambient light level within the building area. The controller luminaire nodes are members of a defined group of nodes that share, with one another, data for synchronizing their internal states, based in part on the ambient light levels that the one or more sensors are reporting. Meanwhile, each luminaire node also continually updates its own internal state based on the synchronization data received from the other nodes.

Each node in the synchronization group comprises: a receiver, a controller, an actor unit or an output controlling an actor unit, and a transmitter. The receiver, as part of a network interface, is configured to receive synchronization messages from other nodes in the plurality of nodes, wherein each synchronization message contains a value of an internal state.

The controller of the illustrative embodiment is a Proportional-Integral ("P-I") controller, and the internal-state value being synchronized is based on the Integral ("I") control term. The controller is configured to generate a correction value that is dependent on the value of the internal state that is received in the synchronization message. The controller is also configured to generate an output value for controlling the actor unit, which is configured to perform a function that is dependent on the output value. The output value is dependent on the controller's updated internal-state value, which is dependent on the correction value.

The transmitter, as part of the network interface, is configured to transmit, into the data network, one or more synchronization messages as needed containing a value of the controller's internal state. Thus, each node is capable of sharing its internal state with other nodes, in addition to receiving and acting upon synchronization data received from the other nodes.

The system disclosed herein is advantageous over at least some approaches in the prior art, in that it avoids the use of acknowledgment messages as responses to the sensor data messages, thereby avoiding unnecessary message transmission overhead. The disclosed system also avoids imposing timing constraints across the controller nodes, thereby enabling each controller node to perform optimally according to its own timing considerations, while at the same time accounting for state-related information received from other controller nodes.

In accordance with the illustrative embodiment, the controller nodes within the data network of the illustrative embodiment are luminaires comprising lamps that provide light to, and serve as light sources for, their environment within a building. The controller nodes control the ambient light within at least a portion of the building. As those who are skilled in the art will appreciate after reading this specification, however, the nodes can be devices that are other than luminaires and the physical condition being controlled can be something other than the ambient light levels in the building. Furthermore, the controller unit of a node can be a different type of controller than a P-I controller, and the node can share and use a different type of internal-state value than one that is based on the Integral control term.

An illustrative data network that includes a plurality of nodes, comprises: a first controller node in the plurality of nodes, comprising: (i) a receiver configured to receive wirelessly a first message from another node in the plurality of nodes, wherein the first message contains a first state value of a first internal state, (ii) a controller configured to generate a first correction value, $IS_{corr1}$, that is dependent on the first state value of the first internal state, received in the first message, and (iii) a transmitter configured to transmit wirelessly a second message containing a second state value of the first internal state; and a second node in the plurality of nodes, comprising: (i) a receiver configured to receive wirelessly the second message, and (ii) a controller configured to generate a second correction value, $IS_{corr2}$, that is dependent on the second state value of the first internal state, received in the second message; wherein the first and second nodes are further configured to repeatedly transmit messages containing values of the first internal state, wherein the messages comprise the first and second messages.

Another illustrative data network that includes a plurality of nodes, comprises: a first luminaire in the plurality of luminaires, comprising: (i) a receiver configured to receive wirelessly a first message from another luminaire in the plurality of luminaires, wherein the first message contains a first state value of a first internal state, (ii) a controller configured to generate a first correction value, $IS_{corr1}$, that is dependent on the first state value of the first internal state, received in the first message, and (iii) a lamp configured to provide light at a light output that is dependent on the first correction value, and (iv) a transmitter configured to transmit wirelessly a second message containing a second state value of the first internal state; and a second luminaire in the plurality of luminaires, comprising: (i) a receiver configured to receive wirelessly the second message, (ii) a controller configured to generate a second correction value, $IS_{corr2}$, that is dependent on the second state value of the first internal state, received in the second message, and (iii) a lamp configured to provide light at a light output that is dependent on the second correction value; wherein the first and second luminaires are further configured to repeatedly transmit messages containing values of the first internal state, wherein the messages comprise the first and second messages.

Yet another illustrative data network that includes a plurality of nodes, comprises: a sensor configured to monitor ambient light level and to report values of the ambient light level; a first luminaire in the plurality of luminaires, comprising: (i) a receiver configured to receive wirelessly a first message from another luminaire in the plurality of luminaires, wherein the first message contains a first state value of a first internal state, (ii) a controller configured to generate a first correction value, $IS_{corr1}$, that is dependent on the first state value of the first internal state, received in the first message, and (iii) a lamp configured to provide light at a light output that is dependent on the first correction value, and (iv) a transmitter configured to transmit wirelessly a second message containing a second state value of the first internal state; and a second luminaire in the plurality of luminaires, comprising: (i) a receiver configured to receive wirelessly the second message, (ii) a controller configured to generate a second correction value, $IS_{corr2}$, that is dependent on the second state value of the first internal state, received in the second message, and (iii) a lamp configured to provide light at a light output that is dependent on the second correction value; wherein the first and second luminaires are further configured to repeatedly transmit messages containing values of the first internal state, wherein the messages comprise the first and second messages, and wherein one or more of the values of the first internal state are dependent on the values of the ambient light level.

DETAILED DESCRIPTION

Figure 1:
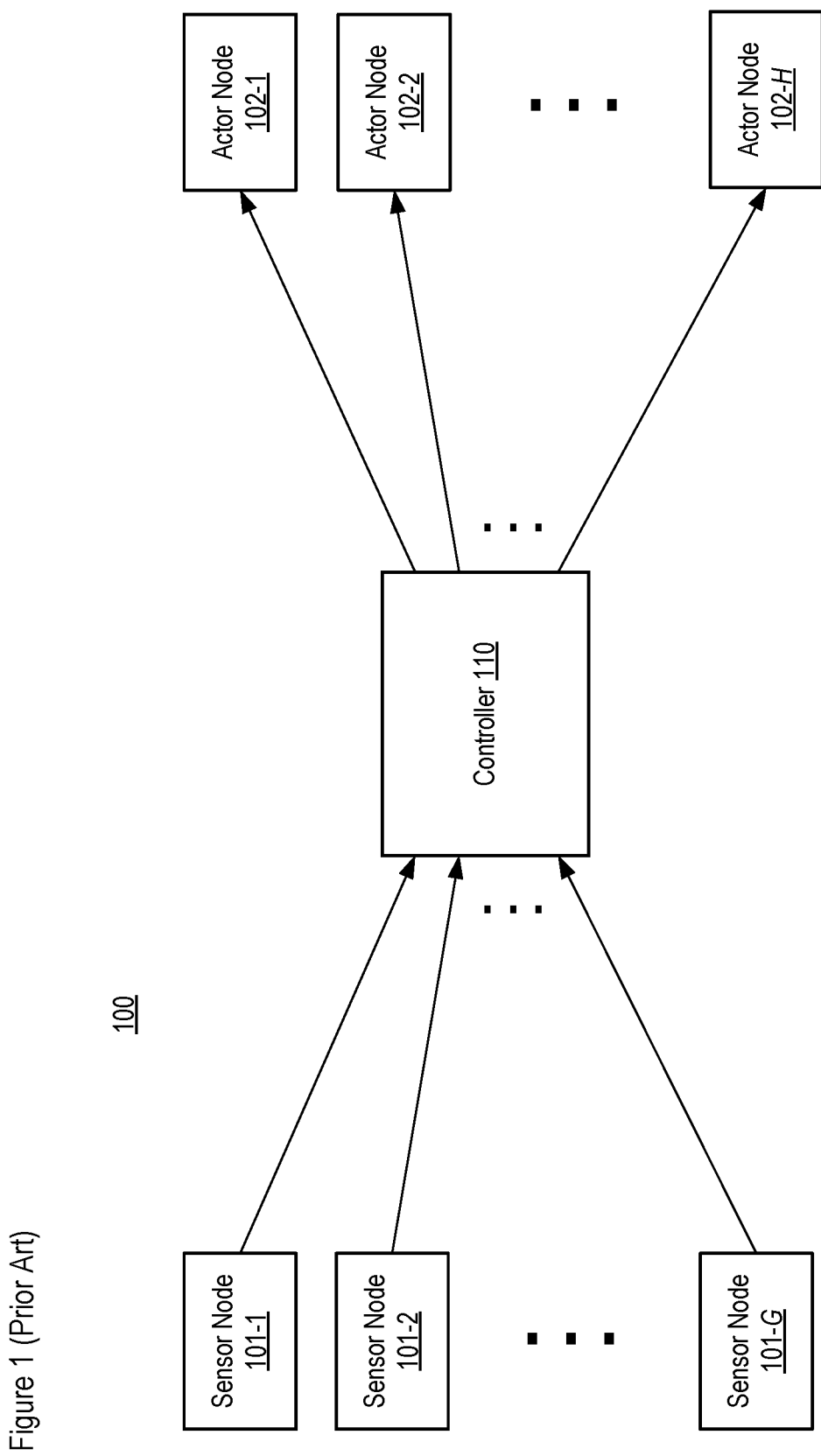
FIG. 1 depicts building control system 100 in the prior art.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Controller Node—For the purposes of this specification, the term "controller node" is defined as a node in a data network comprising a controller that is configured to control an actor unit by generating one or more output values that are used by the actor unit.

Sensor Node—For the purposes of this specification, the term "sensor node" is defined as a node in a data network comprising a sensor unit that is configured to monitor a physical condition and to report sensor data values of the physical condition.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire" is defined as a lighting unit comprising a lamp and a controller for controlling the lamp. A luminaire is an example of a controller node.

Network address—For the purposes of this specification, the term "network address," or "computer network address," is defined as a numerical label assigned to each device (e.g., sensor node, actor node, configuring node, etc.) participating in a computer network. For example, an Internet Protocol address (IP address) is a numerical label assigned to each device participating in a computer network that uses the Internet Protocol for communication. A "source address" is an example of a network address, in that it specifies the device that originated a transmitted data packet or message conveyed by one or more packets.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are well known in the art are depicted in block diagram form in the accompanying figures in order to keep salient aspects of the present invention from being unnecessarily obscured.

Figure 2:
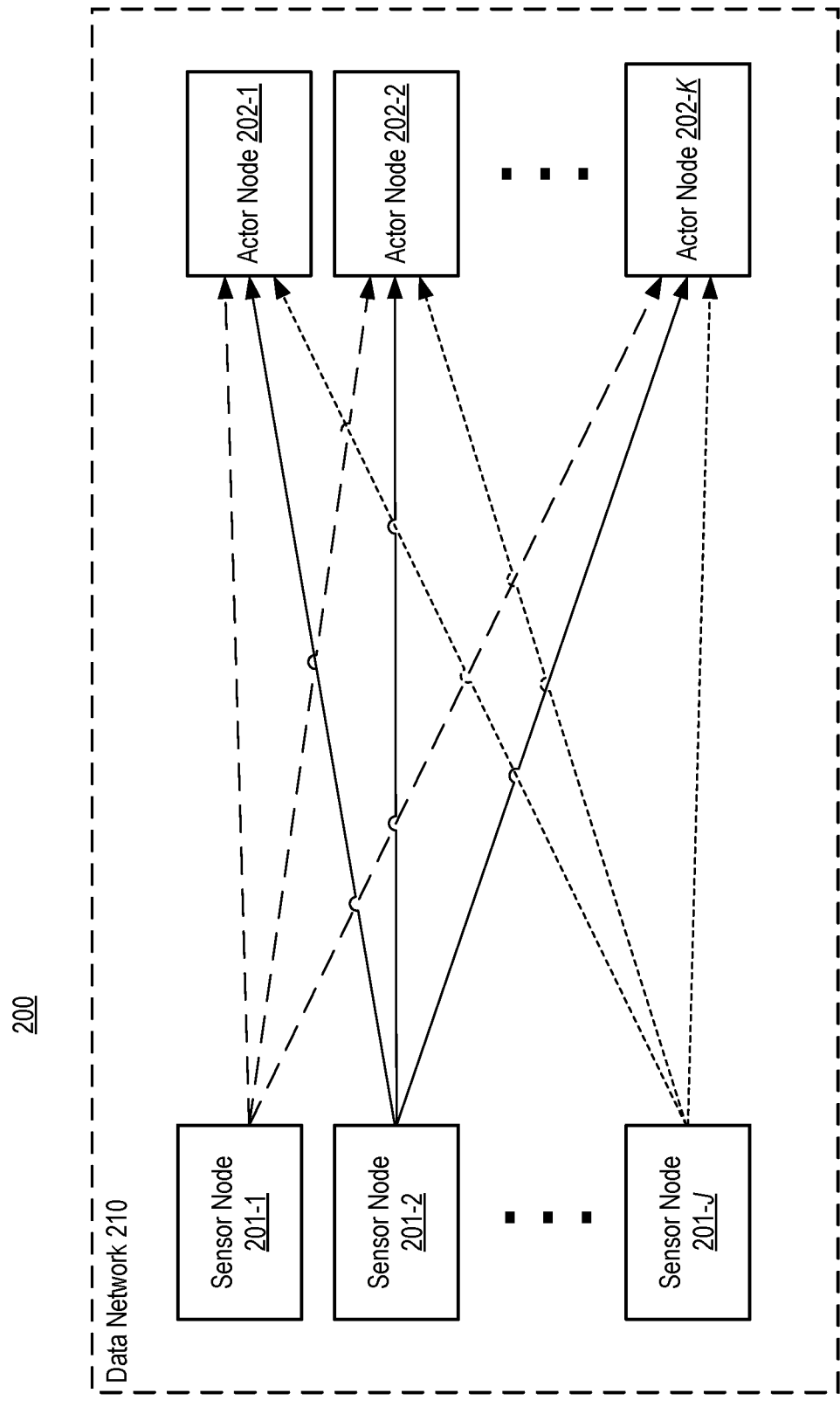
FIG. 2 depicts building control system 200 in accordance with the illustrative embodiment.

FIG. 2 depicts building control system 200 in accordance with the illustrative embodiment, which comprises sensor nodes 201-$j$, where j is a positive integer from 1 to J and actor nodes 202-$k$, where k is a positive integer from 1 to K, and where the plurality of nodes communicate with each other within data network 210. In control system 200, sensor node 201-$j$ (hereinafter generically "sensor node 201") is depicted as being able to communicate with each actor node 202-$k$ (hereinafter generically "actor node 202").

Control system 200 is an example of a system having distributed logic, in contrast to control system 100 in the prior art that has centralized control logic (provided by system controller 110). More particularly, in control system 200 in the illustrative embodiment, the functionality that is provided in system 100 by system controller 110, is distributed among other elements of the control system, particularly among actor nodes 202. In some alternative embodiments of the present invention, some or all of the functionality that is provided in system 100 by system controller 110, is distributed among sensor nodes 201.

Sensor nodes 201 are configured to provide data to actor nodes 202 on one or more physical conditions that are being monitored by the sensors. When the sensor data is received by actor nodes 202, the actor nodes can use the sensor data to control actor units as described below, wherein the actor units are configured to perform one or more functions. The communication, however, between sensor nodes 201 and actor nodes 202, as represented by arrows, is not necessarily reliable. The communication can be unreliable in the sense that one or more of actor nodes 202 might not receive one or more messages containing sensor data. Consequently, one or more output values from the controllers or controller logic of actor nodes 202 might be out of synch with one another and need to be coordinated, in the manner described below and in accordance with the illustrative embodiment.

As depicted in FIG. 2, sensor functionality and actor functionality reside in separate nodes. As those who are skilled in the art will appreciate after reading this specification, in some embodiments a sensor node can further comprise actor functionality, or an actor node can further comprise sensor functionality, or both.

Data network 210 is a mesh network, as is known in the art, and enables communication among sensor nodes 201-1 through 201-J and actor nodes 202-1 through 202-K. To this end, the nodes within network 210 distribute data (e.g., the packet-based messages, etc.) amongst one another in accordance with Bluetooth mesh networking. A "mesh network" is a network topology in which each node relays data for the network. The nodes that are involved cooperate in the distribution of data in the network. A mesh network can relay messages using a flooding technique or a routing technique, or a combination of the two.

In some other embodiments, network 210 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on. Furthermore, as those who are skilled in the art will appreciate after reading this specification, at least some network nodes depicted in FIG. 2 in some embodiments can be connected directly and non-wirelessly to one other, at least for some purposes and/or for some portion of time, such as through Universal Serial Bus (USB), FireWire™, or Thunderbolt™, for example and without limitation.

Figure 3:
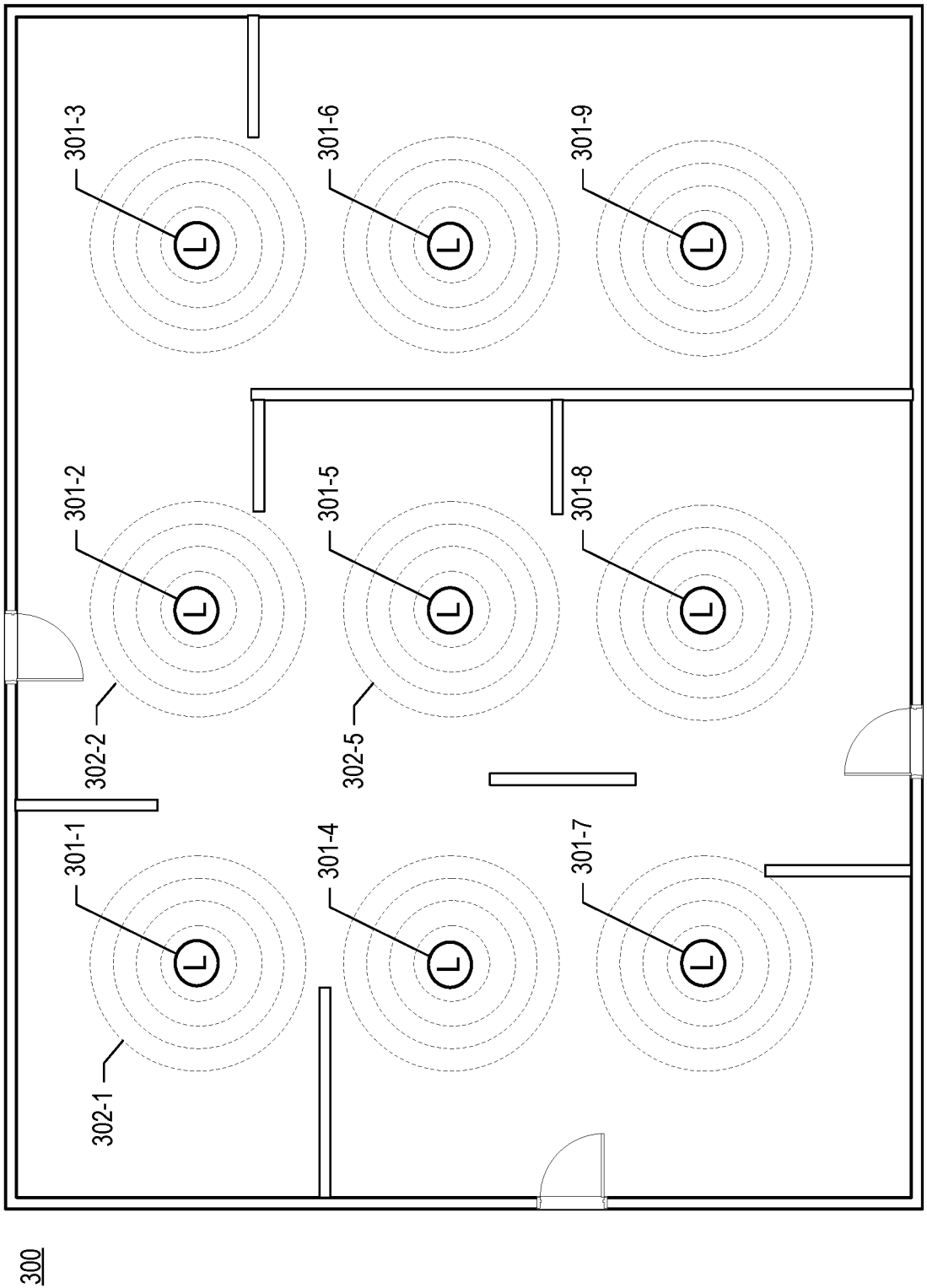
FIG. 3 depicts at least some of the nodes within data network 210 of system 200.

FIG. 3 depicts at least some of the nodes within data network 210, in accordance with the illustrative embodiment. The nodes are depicted according to how they are situated within building 300, according to a floor plan. Building 300 is equipped with network nodes 301-1 through 301-M, wherein M is a positive integer (e.g., M equal to 9 as depicted, etc.). As depicted in FIG. 3, nodes 301-1 through 301-M are light fixtures (or "luminaires" and denoted by "L"). The networked nodes communicate wirelessly with one another via transmitted signals 302-1, 302-2, and so forth, via network 210. In some alternative embodiments of the present invention, however, one or more of the depicted elements can communicate via wired connections.

Node 301-$m$, wherein $m$ has a value between 1 and M, inclusive, is an apparatus that comprises memory, processing components, and communication components. Node 301-$m$ is configured to transmit signals 302-$m$ that convey control-related information, such as packet-based messages. Node 301-$m$ is also configured to provide light at an output that is based, at least in part, on the content of one or more messages received from one or more other luminaires (e.g., sensor data messages, synchronization messages, etc.). In some embodiments of the present invention, node 301-$m$ can also be configured to sense one or more physical conditions and can transmit messages based on the one or more physical conditions sensed. Node 301-$m$ is described in detail below and in FIG. 4.

In accordance with the illustrative embodiment, nodes 301-1 through 301-M are luminaires comprising lamps that provide light to, and serve as light sources for, their environment within building 300. As those who are skilled in the art will appreciate after reading this specification, however, the nodes can be devices that are other than luminaires. For example, one or more of the luminaires can be other types of nodes, such as sound systems or sprinklers, that provide a different type of output than light, such as sound or water.

Nodes 301-1 through 301-M are similar to actor nodes 202, in that they each comprise a controller unit and an actor unit in the illustrative embodiment, a luminaire with controller logic and comprising a controllable lamp as an actor unit. At least some of nodes 301-1 through 301-M further comprise sensor units, such as ambient light sensors (ALS) that measure illuminance; nodes comprising sensor units are also considered to be sensor nodes, such as sensor nodes 201. In some embodiments, some nodes might be present within the depicted data network that are sensor nodes, but that are not also controller nodes or actor nodes.

In accordance with the illustrative embodiment, nodes 301-1 through 301-M constitute an automation and control system more specifically, a networked lighting system in a commercial building, such as an office space or a retail space. As those who are skilled in the art will appreciate after reading this specification, however, the luminaires can also be applied to a different type of building, such as a home, or to include the environment surrounding the building, or to any environment in which automated control can be applied.

Furthermore, building 300 can be a different type of structure with a roof and walls, or can instead be a defined area that comprises multiple sub-areas (e.g., open space, one or more conference rooms, one or more corridors, one or more closed offices, etc.). At least a portion of the area and/or sub-areas can be defined by something other than a roof and/or walls (e.g., a tent, an outdoor pavilion, a covered parking lot, a stadium or arena, etc.).

As depicted, nodes 301-1 through 301-M are positioned uniformly in a grid-like pattern. However, as those who are skilled in the art will appreciate after reading this specification, the luminaires can be positioned in any geometry or geometries with respect to one another, provided that each luminaire is within communication range of one or more of the other luminaires.

Figure 4:
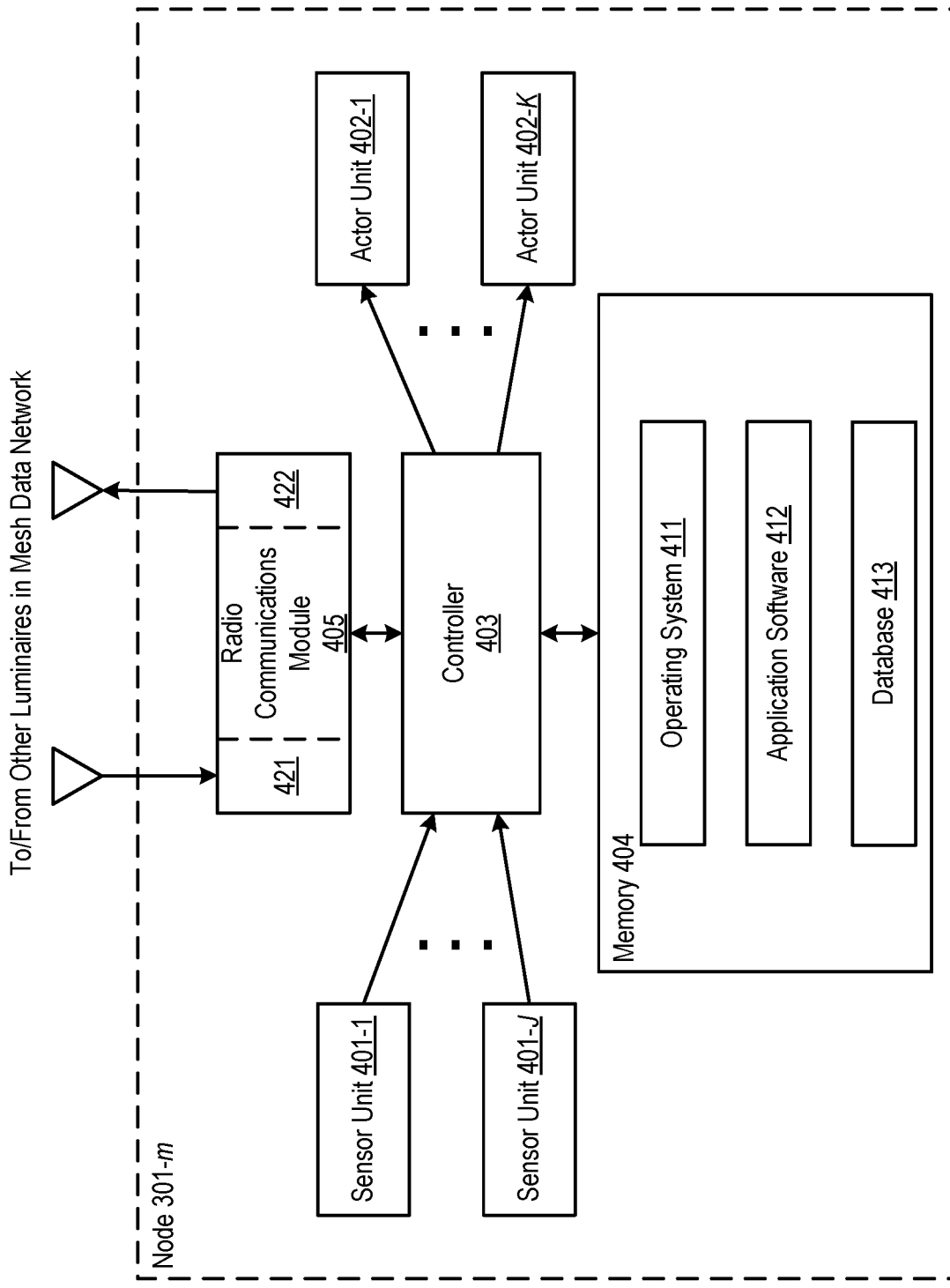
FIG. 4 depicts the salient components of node 301-*m*.

FIG. 4 depicts the salient components of node 301-$m$ according to the illustrative embodiment. Node 301-$m$ is based on a data-processing apparatus whose hardware platform comprises: sensor unit 401-1 through 401-J, wherein J is a positive integer, actor unit 402-1 through 402-K, wherein K is a positive integer, controller 403, memory 404, and radio communications module 405, interconnected as shown.

Sensor unit 401-$j$, wherein $j$ has a value between 1 and J, inclusive, is an apparatus that comprises memory, processing components, and communication components, and is configured to gather information about the environment that is accessible by the sensor unit. Each sensor is configured to monitor a particular physical condition in well-known fashion (e.g., temperature, ambient light, humidity, occupancy, etc.). For example, at least some of nodes 301-1 through 301-9 comprise an ambient light sensor.

Each sensor unit is configured to report a state of the condition by providing input signals to controller 403, wherein the values of the input signals are representative of the states being reported. A given sensor unit 401-$j$ can report discrete input signal values and/or a continuum of states and can report states at particular times and/or continuously and/or asynchronously. A change in state, which is determined by controller 403 as described below, can occur based one or more sensor units detecting changes in the following, in any combination:

i. environmental probes (e.g., temperature, ambient light, motion, infrared signature, humidity, etc.).
  ii. electrical inputs (i.e., binary, analog, bus), including from a switch.
  iii. signals received via radio (e.g., proximity beacons, etc.).
  iv. a state of the internal logic, woken up periodically based on time or on an external event.

For example and without limitation, a state change can correspond to a switch being actuated, occupancy being detected, a timer or counter reaching a predefined value, and so on.

Actor unit 402-$k$, wherein $k$ has a value between 1 and K, inclusive, is an apparatus that comprises memory, processing components, and communication components, and is capable of doing something in the course of being affected by signals originating externally to the actor component, such as from controller 403, as described in detail below. In particular, actor unit 402-$k$ is configured to perform a function that is dependent on an output value from controller 403, which in turn is based on an internal state value derived from a correction value, as described below. Each actor unit acts upon its environment in well-known fashion.

Actor unit 402-$k$ is configured to receive, transmit, process, and/or relay signals conveying data, as well as being configured to affect a condition, physical or otherwise, in its environment, for example by generating a control signal. In accordance with the illustrative embodiment, actor unit 402-1 of each node 301-1 through 301-9 is a lamp whose output is modifiable by controller logic executed by controller 403, based on an internal state value that is calculated as described below.

As those who are skilled in the art will appreciate after reading this disclosure, actor unit 402-$k$ can provide a different function than controlling a lamp to give light according to a configurable light output. For example and without limitation, the condition being affected can be:
 i. lighting, which can be adjusted (e.g., turning on or off, changing light output, changing brightness, changing color or mood, changing illuminance, displaying a picture or pattern, etc.).
 ii. sound, which can be adjusted (e.g., increasing or decreasing volume, changing playlist or mood, turning on/off, selecting signal source, etc.).
 iii. room climate, which can be controlled (e.g., increasing or decreasing temperature, humidity, air fragrance, fan speed, etc.).
 iv. an alert, which can be generated (e.g., of an email, of an SMS message, etc.).
 v. monitoring by a camera, which can be panned or tilted.
 vi. office meeting/presentation settings (e.g., selecting one or more of signal source, streaming application, multimedia to play, audio language, subtitles, chapter, play/pause/stop, rewind/fast forward, etc.).
 vii. connected/smart video monitor features (e.g., selecting application to be launched, navigating through on-screen menus, etc.).
 viii. virtual keyboard navigation on virtual keyboard displayed by other device (e.g., video monitor, set-top box, etc.).
 ix. control of shades/window coverings/blinds.
 x. access control (e.g., unlocking/locking doors, opening/shutting doors, authorizing access to selected rooms or zones, etc.).

Furthermore, node 301-$m$ can comprise any combination of and any number of actor functions. As those who are skilled in the art will appreciate, after reading this disclosure, node 301-$m$ that comprises one or more actor functions can be in a variety of forms, such as a luminaire in a lighting system as in the illustrative embodiment, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Controller 403 is a processing device, such as a microcontroller or microprocessor with a controller interface, which are well known in the art. Controller 403 is configured such that, when operating in conjunction with the other components of node 301-$m$, controller 403 executes software, processes data, and telecommunicates according to the operations described herein, including those depicted in FIGS. 6 through 11.

Memory 404 is non-transitory and non-volatile computer storage memory technology that is well known in the art (e.g., flash memory, etc.). Memory 404 is configured to store operating system 411, application software 412, and database 413. The operating system is a collection of software that manages, in well-known fashion, node 301-$m$'s hardware resources and provides common services for computer programs, such as those that constitute the application software. The application software that is executed by controller 403 according to the illustrative embodiment enables node 301-$m$ to perform the functions disclosed herein.

It will be clear to those having ordinary skill in the art how to make and use alternative embodiments that comprise more than one memory 404; or comprise subdivided segments of memory 404; or comprise a plurality of memory technologies that collectively store the operating system, application software, and database.

Radio communications module 405 is configured to enable node 301-$m$ to telecommunicate with other devices and systems, including other mesh network nodes, by receiving signals therefrom and/or transmitting signals thereto via receiver 421 and transmitter 422, respectively. Radio communications module 405 communicates in accordance with Bluetooth mesh networking. In some other embodiments, radio communications module 405 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on.

Receiver 421 is a component that enables node 301-$m$ to telecommunicate with other components and systems by receiving signals that convey information therefrom, specifically messages from other nodes within data network 210. It will be clear to those having ordinary skill in the art how to make and use alternative embodiments that comprise more than one receiver 421.

Transmitter 422 is a component that enables node 301-$m$ to telecommunicate with other components and systems by transmitting signals that convey information thereto, specifically messages that can be received by other nodes within data network 210. For example and without limitation, transmitter 422 is configured to transmit packets comprising the information described below and in FIGS. 6 through 10. It will be clear to those having ordinary skill in the art how to make and use alternative embodiments that comprise more than one transmitter 422.

In accordance with the illustrative embodiment, node 301-$m$ uses radio communications module 405 in order to telecommunicate wirelessly with external devices. It will clear to those skilled in the art, however, after reading the present disclosure, how to make use and use various embodiments of the present invention in which node 301-$m$ communicates via a wired protocol (e.g., X10, KNX, etc.) over physical media (e.g., cable, wire, etc.) with one or more external devices, either in addition to or instead of the wireless capability provided by radio communications module 405.

In generating and transmitting one or more packets that convey a message within data network 210, along with including its own network address as the source address in the message, node 301-$m$ is said to originate the message. Node 301-$m$ is further capable of forwarding a message that has been originated by a different node. For example, node 301-9 might originate and transmit one or more messages containing ALS sensor data, node 301-6 might act upon those messages transmitted by node 301-9 by adjusting the light output level of its lamp; node 301-6 might also retransmit the sensor data messages that it receives, so that other nodes (e.g., node 301-3, etc.) may act on and/or retransmit the sensor data.

With regard to a specific node's configuration, node 301-$m$ can be configured as a sensor node in that it includes, as a minimum, sensor unit or units 401, components configured to transmit the sensor data into data network 210, and, possibly, components configured to receive data transmitted by other nodes. Alternatively, node 301-*m* can be configured as a controller node in that it includes, as a minimum, controller 403, actor unit or units 402, components configured to receive sensor data transmitted by other nodes, and, possibly, components configured to transmit data into data network 210. As those who are skilled in the art will appreciate after reading this specification, node 301-*m* can be configured according to other combinations of the components depicted in FIG. 4 (e.g., to include both sensor node- and controller node-related components, etc.), depending on the functionality required of the node.

Figure 5:
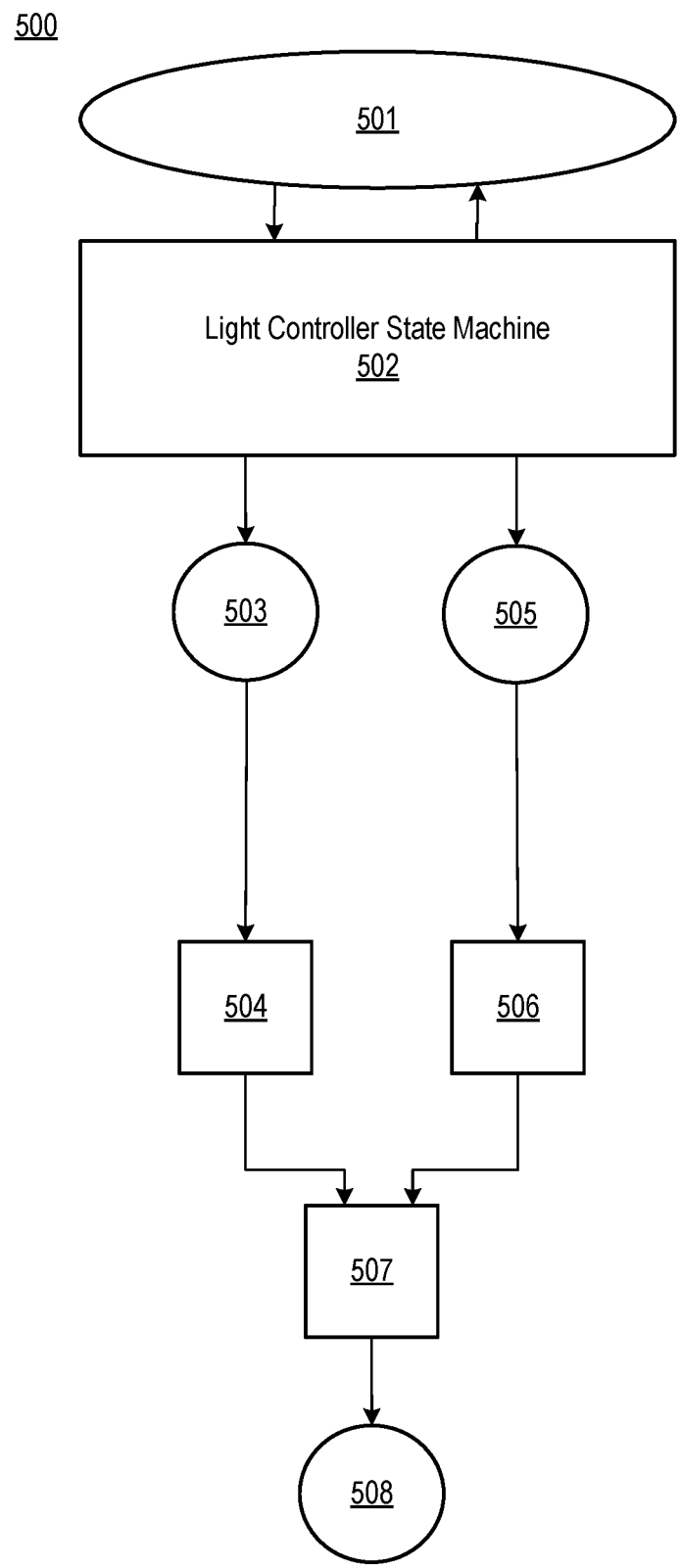
FIG. 5 depicts the salient features of controller architecture 500, which defines, at least in part, the controller logic executed by controller 403 of luminaire node 301-*m*.

FIG. 5 depicts the salient features of Light Lightness Controller (LC) architecture 500, which defines, at least in part, the controller logic executed by controller 403 of luminaire node 301-*m*. In accordance with the illustrative embodiment, the luminaire node is a PI (Proportional-Integral) controller as is known in the art. Because controller 403 uses an integral control term, it is considered to be a sequential controller and, consequently, has internal states. The Light LC is defined in Mesh Model Bluetooth® Specification, Revision v1.0, dated Jul. 13, 2017 (hereinafter, the "Mesh Model"), which is incorporated herein by reference.

Inputs 501 are input states to the light LC state machine 502. At least some of the inputs correlate to data (e.g., physical conditions, etc.) reported by one or more sensors. Lightness Out state 503 feeds into Squaring Function 504, and the results of which feed into Function 507, which selects the maximum of its inputs. Lux Level Out state 505 feeds into PI regulator 506, and the results of which feed into Function 507. The maximum of the inputs into Function 507 is selected as Linear Output 508, which corresponds to output of lamp of node 301-*m*. All of the aforementioned elements are described in the Mesh Model.

As those who are skilled in the art will appreciate after reading this specification, in some embodiments of the present invention the controller logic executed by controller 403 of node 301-*m* can be defined by architecture 500 with additional extensions or by a different architecture entirely. For example and without limitation, instead of being a PI controller, controller 403 can have an architecture that defines it as a PID (Proportional-Integral-Derivative) controller or a fuzzy logic controller.

As a PI controller, controller 403 repeatedly calculates an error value as the difference between a desired setpoint and a measured process variable and applies a correction based on proportional ("P") and integral ("I") control terms. In accordance with the illustrative embodiment, the setpoint of each luminaire in a defined group of luminaires is defined in terms of a light lightness (lux) value, which is the same across all luminaires in the group. That is, all of the luminaires in the defined group are configured to maintain a constant lux level, defined by the setpoint using a closed-loop algorithm by processing input values provided by ambient light sensors. Each luminaire repeatedly calculates, for example:

i. the integral control term, which is based on the calculated error value based on, at least in part, the previous integral term and the most recently received ALS value (i.e., the measured process variable), and ii. the output value with which to control the luminaire's light output level of its lamp.

As described earlier, the communication between nodes comprising sensors and other nodes is not assumed to be perfectly reliable; indeed, a message containing sensor data (e.g., ambient light level, etc.) and transmitted by one luminaire (e.g., node 301-1, etc.) might not be received by one or more of other luminaires (e.g., node 301-2 node 301-5, etc.). For that matter, the synchronization messages transmitted by controller nodes as described below are also not assumed to be transmitted in a perfectly reliable manner; indeed, one or more of such messages might also be lost. As a result, the most recently received ALS value at one luminaire within a group might be different than the most recently received ALS value at another luminaire within the group. Also as described earlier, the controllers of the luminaires have internal states. Consequently, one or more output values from the controllers or controller logic of a group of luminaires might be out of synch with one another and need to be coordinated. A method of imposing synchronization across the controllers is described below.

Figure 6:
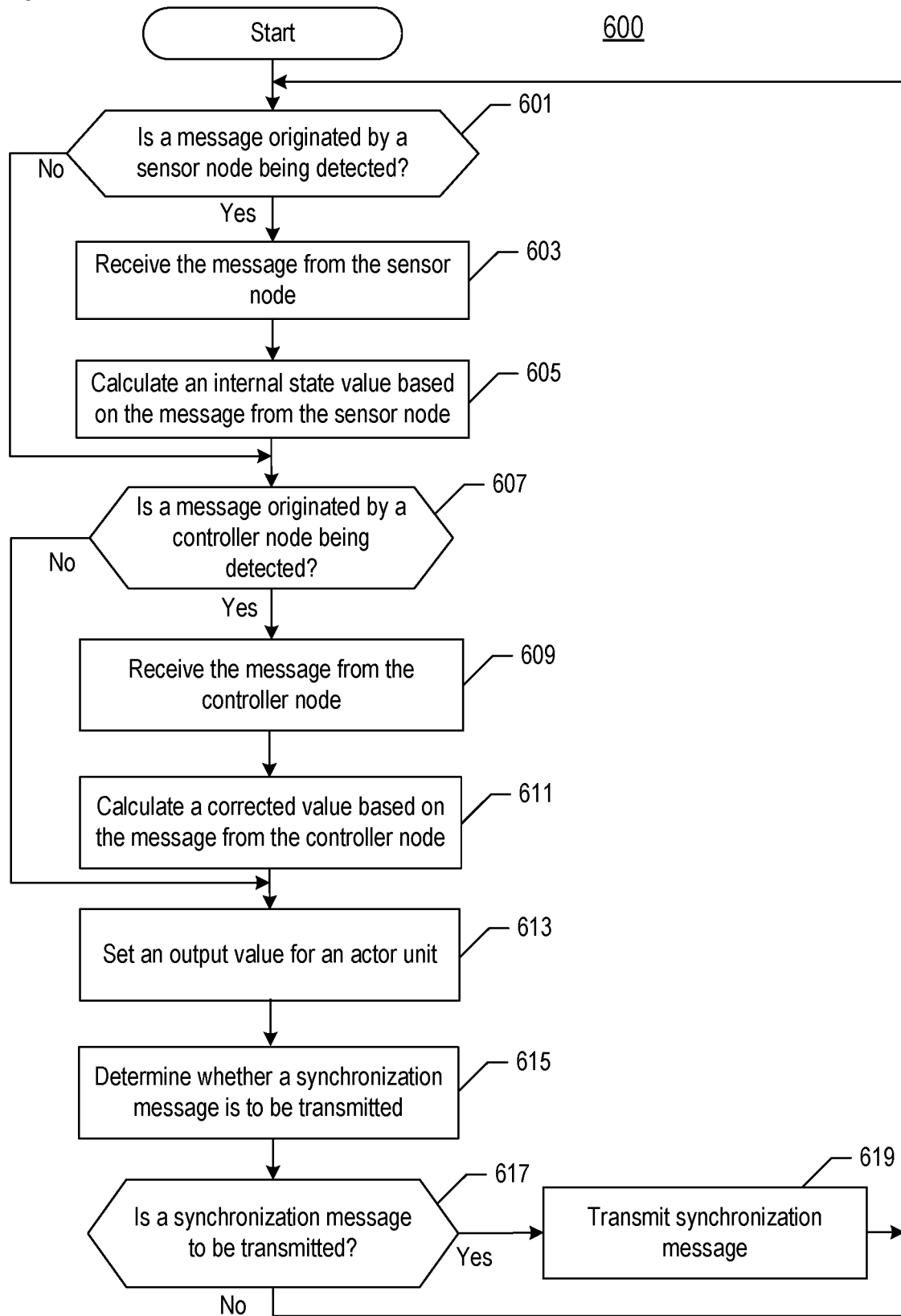
FIG. 6 depicts salient operations of method 600 according to the illustrative embodiment, by which each node 301-*m* performs various functions related to processing messages for synchronizing internal controller states.

Operations of Node 301-*m*:

FIG. 6 depicts salient operations of method 600 according to the illustrative embodiment, by which each node 301-*m* performs various functions related to processing synchronization messages received from other nodes within data network 210 and to transmitting synchronization messages for other nodes to process.

In regard to method 600, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than node 301-*m*.

Node 301-5 is featured here for pedagogical purposes as performing the operations associated with method 600. As those who are skilled in the art will appreciate after reading this specification, other nodes in a defined group of plural nodes within data network 210 perform method 600 concurrently with node 301-5 and with one another. In particular, the nodes concurrently calculate correction values (e.g., $IS_{corr1}$ in node 301-5, $IS_{corr2}$ in node 301-6, etc.), calculate corrected values of internal states based on the respective correction values, and transmit synchronization messages containing information related to the corrected internal state values.

In accordance with operation 601, node 301-5 monitors for messages being transmitted that contain sensor data that is, from a node transmitting a source network address that is known to represent an originating source of sensor data. Only if a sensor data message is detected does the control of the task execution proceed to operation 603. Otherwise, control of task execution proceeds to operation 607.

In accordance with operation 603, node 301-5 receives the message containing sensor data.

In accordance with operation 605, node 301-5 calculates an internal state value based on the message received at operation 603. Operation 605 is described below and with respect to FIG. 7.

In accordance with operation 607, node 301-5 monitors for messages being transmitted that contain synchronization data that is, from a node transmitting a source network address that is known to represent an originating source of synchronization data. Only if a synchronization data message is detected does the control of the task execution proceed to operation 609. Otherwise, control of task execution proceeds to operation 613.

In accordance with operation 609, node 301-5 receives the message containing synchronization data.

In accordance with operation 611, node 301-5 calculates a corrected value based on the message received at operation 609. Operation 611 is described below and with respect to FIG. 8.

In accordance with operation 613, node 301-5 sets an output value for its actor unit 402. Operation 613 is described below and with respect to FIG. 9.

In accordance with operation 615, node 301-5 determines whether a message containing synchronization data is to be transmitted. Operation 615 is described below and with respect to FIG. 10.

If a message containing synchronization data is to be transmitted, based on the results of operation 615, control of task execution proceeds to operation 619. Otherwise, control of task execution proceeds back to operation 601.

In accordance with operation 619, node 301-5 transmits a message containing synchronization data. Operation 619 is described below and with respect to FIG. 11.

As mentioned earlier, other nodes in a defined group of plural nodes within data network 210 perform method 600 concurrently with node 301-5 and with one another. Although the values of at least some of the internal states are synchronized across a group of controller nodes, the timing itself of when each operation is performed is not necessarily synchronized. Thus, the transmitting of the synchronization messages is not synchronized across the plurality of controller nodes, in accordance with the illustrative embodiment. In some alternative embodiments of the present invention, however, the transmitting of at least some of the synchronization messages can be synchronized across at least some of the nodes.

After operation 619, control of task execution proceeds back to operation 601, in part to repeatedly transmit the synchronization message containing the value of the internal state that corresponds to whichever particular iteration of method 600 is currently being performed.

Figure 7:
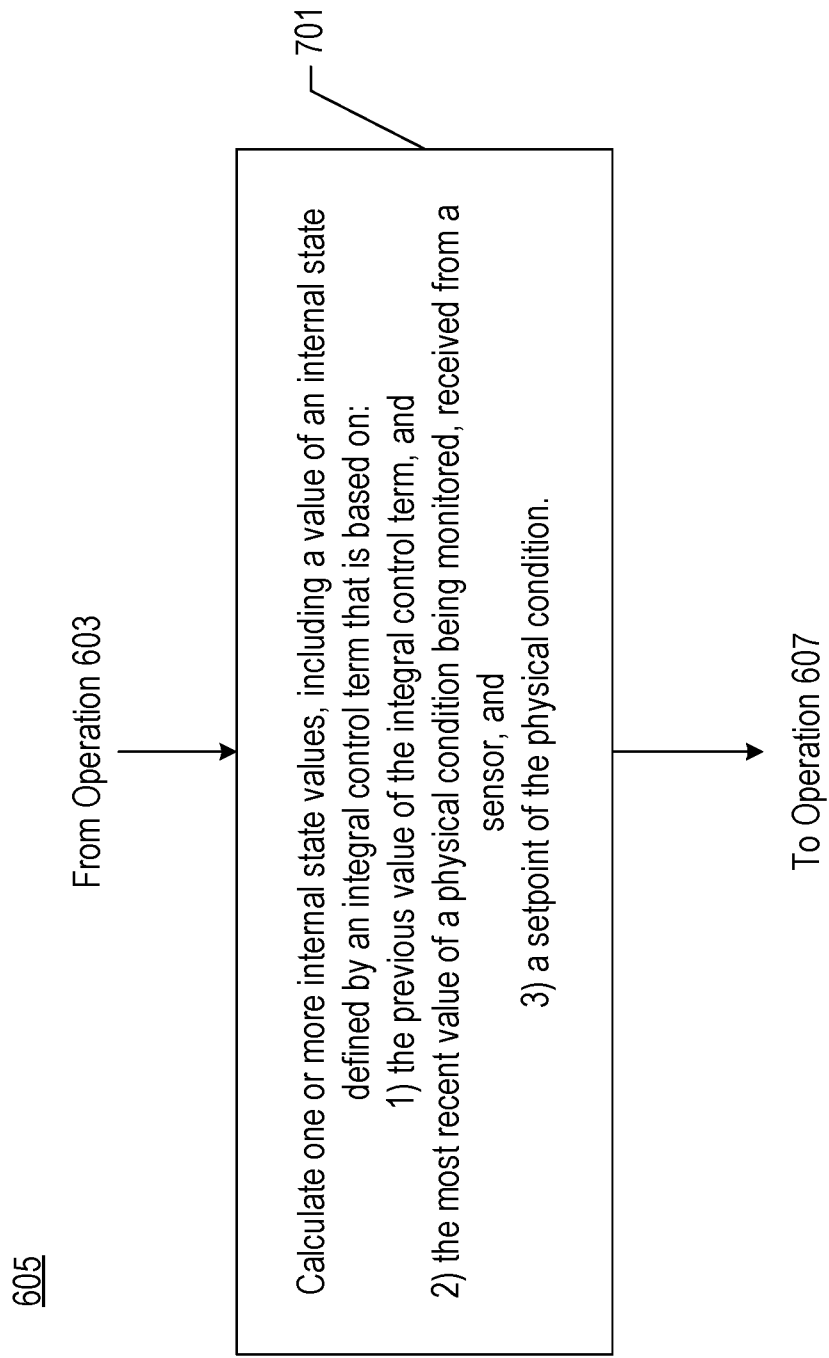
FIG. 7 depicts salient sub-operations of operation 605 of method 600.

Operations of Node 301-m in Calculating an Internal State Value:

FIG. 7 depicts salient sub-operations of operation 605, by which the luminaire performs various functions related to calculating one or more internal state values. In accordance with the illustrative embodiment, the internal state is defined by an integral (I) control term of a PI controller. As those who are skilled in the art will appreciate after reading this specification, in some embodiments the internal state can be defined a different control term, in addition to or instead of the integral control term.

In accordance with operation 701, controller 403 calculates the value of the integral control term, based on i) the previous value of the integral control term, ii) the most recent value of a physical condition being monitored by a sensor, in this case an ALS value, and iii) a desired setpoint value of the physical condition. In some embodiments of the present invention, a goal is for the output value (i.e., for controlling the actor unit 402) to provide a light level so that i) the illuminance subsequently measured by the reporting ALS is equal to ii) the value configured as the setpoint. It will be clear to those skilled in the art how to calculate the value of the integral control term.

Figure 8:
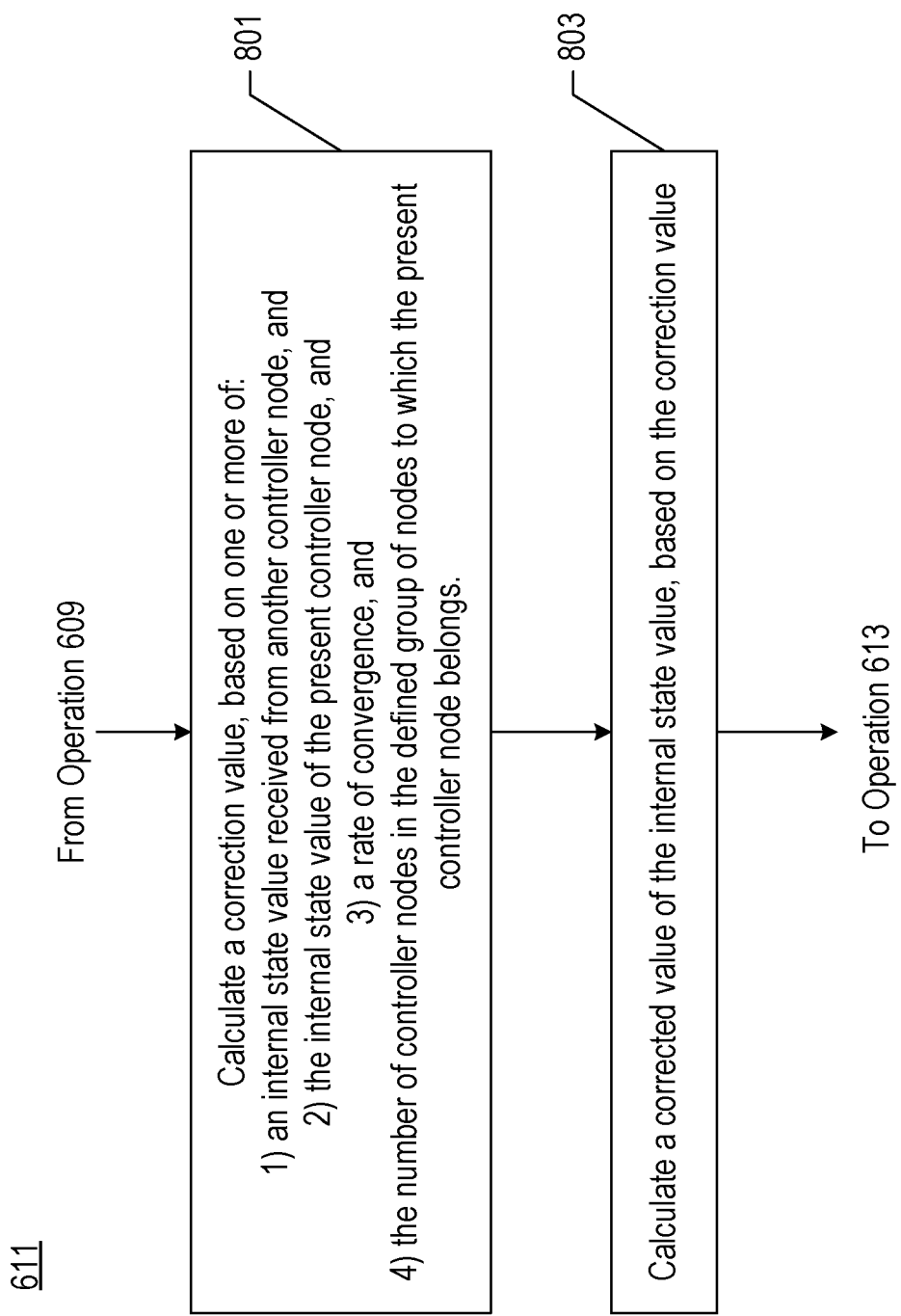
FIG. 8 depicts salient sub-operations of operation 611 of method 600.

Operations of Node 301-m in Calculating a Corrected Value to the Internal State:

FIG. 8 depicts salient sub-operations of operation 611, by which the luminaire performs various functions related to calculating a corrected value to the internal state value calculated in accordance with operation 605.

In accordance with operation 801, controller 403 calculates a correction value, with which to correct the internal state value, based on one or more of:
i. an internal state value received from another controller node,
ii. the internal state value of the present controller node (i.e., node 301-5), calculated in accordance with operation 605,
iii. a desired rate of convergence, and
iv. the number of controller nodes in the defined group of nodes to which the present controller node belongs.

Controller 403 calculates the correction value according to Equation 1:

$$IS_{corr} = k*(IS_{recv} - IS)/C_{count},\qquad(\text{Eq. 1})$$

wherein:
$IS_{corr}$ is the correction value,
k is the desired rate of convergence (e.g., greater than zero, less than 0.5, 0.2, etc.),
$IS_{recv}$ is the value of the internal state that is received from another controller node,
IS is the value of the internal state calculated in accordance with operation 605, and
$C_{count}$ is the number of controller nodes within the defined group of nodes to which the present controller node belongs and that are active (i.e., transmitting synchronization messages).

$C_{count}$ can be determined by controller node 301-5 discovering the number of other controller nodes in the group, by monitoring communication in data network 210. For example and without limitation, the controller node can monitor for sources addresses of the controller nodes within its predefined group and maintain a record of the source addresses that are detected as being in the transmitted synchronization messages. Based on the number of source addresses that correspond to controller nodes that are in the record, controller node 301-5 can determine the total number of controller nodes.

In some alternative embodiments of the present invention, $C_{count}$ is the number of controller nodes within the defined group of nodes to which the present controller node belongs, without any consideration of whether they are active.

In accordance with operation 803, controller 403 calculates a corrected value of the internal state value based on Equation 2:

$$IS_{new} = IS + IS_{corr},\qquad(\text{Eq. 2})$$

wherein:
$IS_{new}$ is the corrected value of the internal state,
IS is the value of the internal state calculated in accordance with operation 605, and
$IS_{corr}$ is the correction value.

Figure 9:
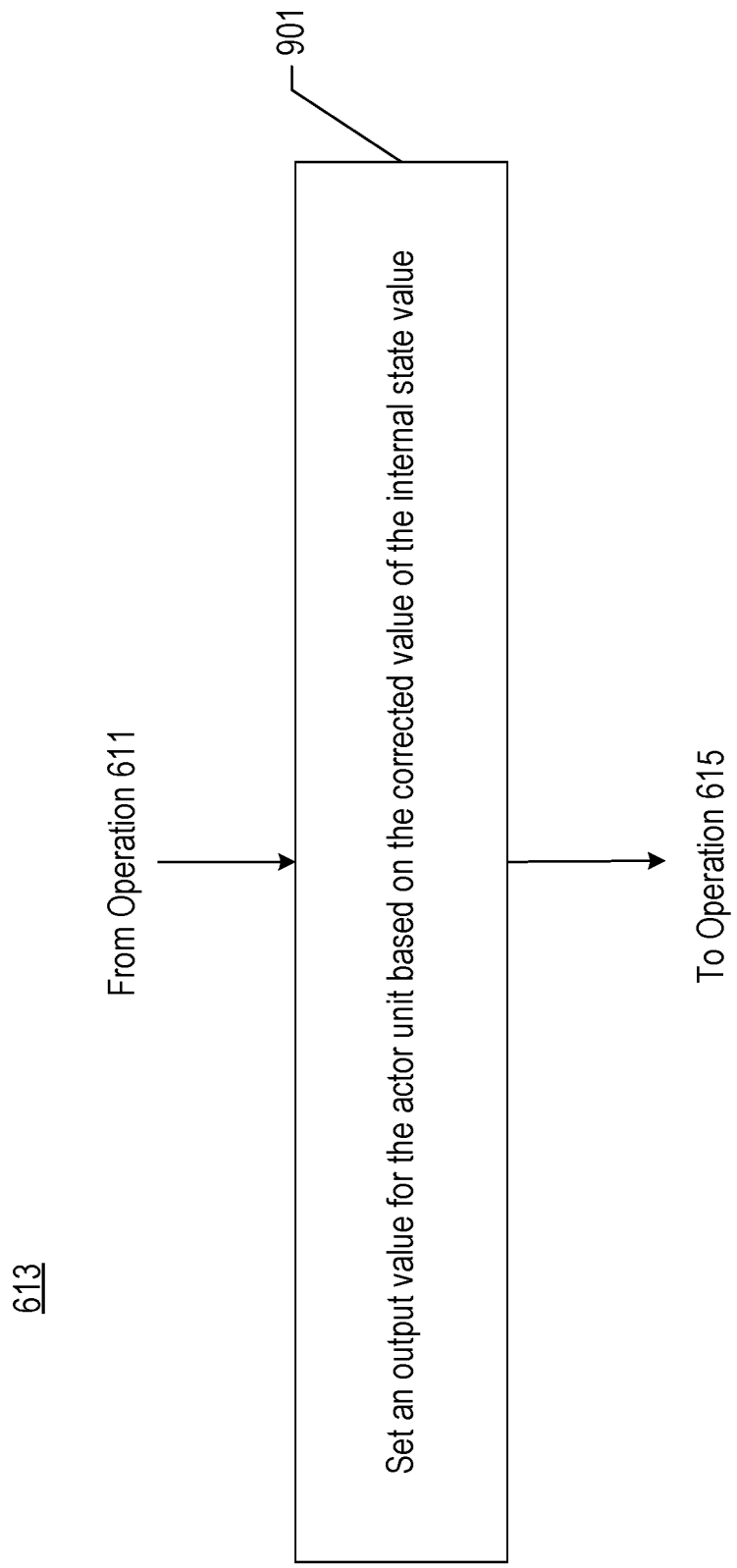
FIG. 9 depicts salient sub-operations of operation 613 of method 600.

Operations of Node 301-m in Setting an Output Value:

FIG. 9 depicts salient sub-operations of operation 613, by which the luminaire performs various functions related to setting an output value to be used by the controlled lamp (i.e., the actor unit).

In accordance with operation 901, controller 403 sets the output value (related to the process variable described above and in regard to FIG. 5) for controlling the actor unit to provide a function at a particular level, wherein the output value is based on $IS_{new}$ determined in accordance with operation 611.

In some alternative embodiments of the present invention, and to guard against causing an unacceptably large change in the output value (e.g., a sudden change in light level perceived by building residents, etc.), controller 403 can calculate $IS_{step}$ according to Equation 3:

$$IS_{step}=IS_{corr}/m, \quad (Eq. 3)$$

wherein:
$IS_{step}$ is a step value that is added (instead of $IS_{corr}$) to IS over m iterative steps in order to obtain $IS_{new}$ in operation 611,
$IS_{corr}$ is the correction value, and
m is the number of iterative steps over which IS is to be corrected by $IS_{corr}$.

As a result, the output value can be gradually changed, rather than suddenly changed.

Figure 10:
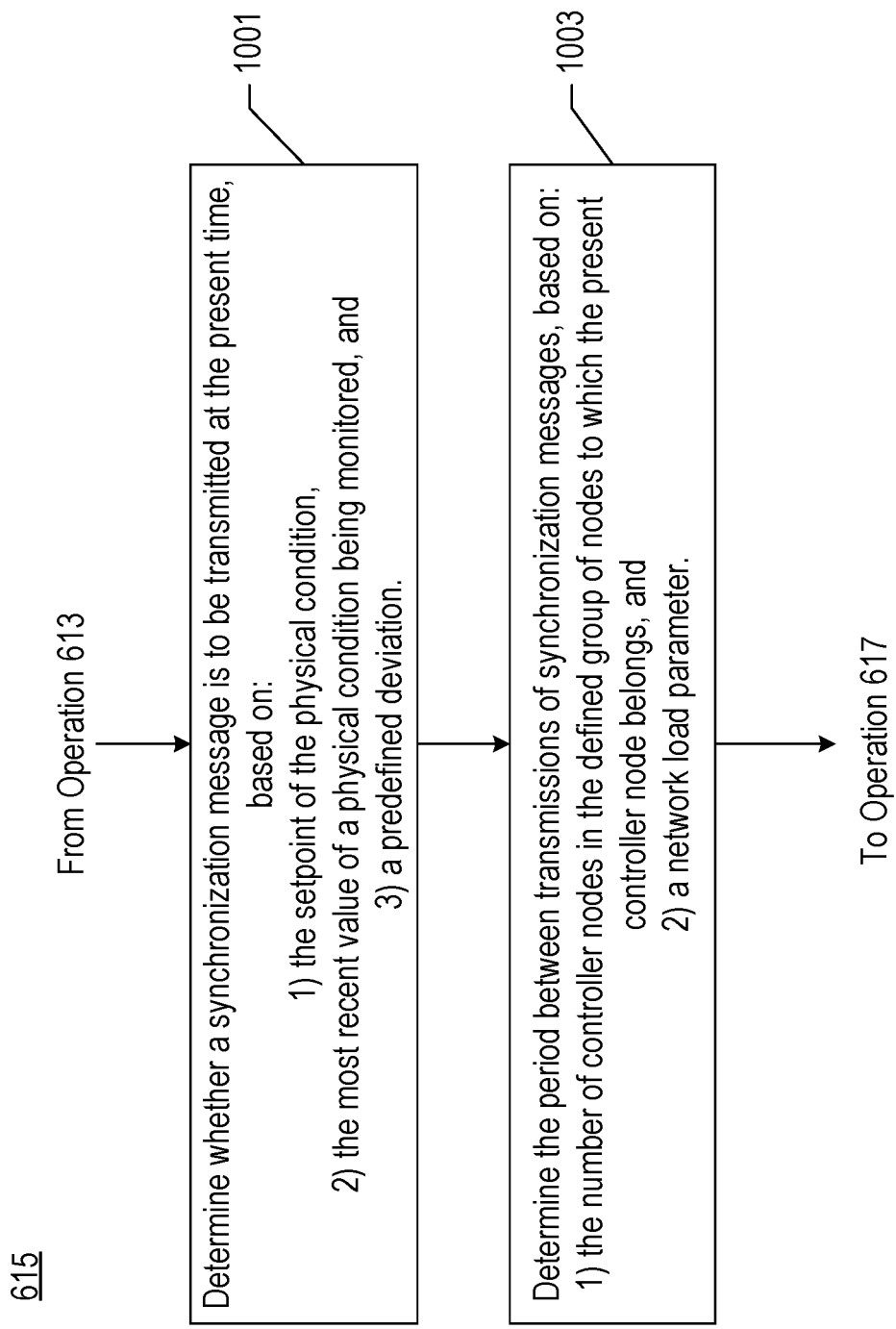
FIG. 10 depicts salient sub-operations of operation 615 of method 600.

Operations of Node 301-*m* in Determining when a Synchronization Message is to be Transmitted:

FIG. 10 depicts salient sub-operations of operation 615, by which the luminaire performs various functions related to determining when the luminaire is to transmit a synchronization message (i.e., for one or more other luminaires to use). Determining when the luminaire is to transmit a synchronization message as described below can reduce the number of messages being transmitted within data network 210 in general, thereby lessening congestion and load on the data network resulting from synchronization messages.

In accordance with operation 1001, controller 403 determines whether synchronization messages are to be transmitted at the present time. To do so, controller 403 first defines a deviation amount. In accordance with the illustrative embodiment, this is a maximum absolute deviation from the setpoint defined in operation 605, expressed in lux. In some alternative embodiments of the present invention, the deviation is instead defined as a maximum relative deviation from the setpoint defined in operation 605, expressed as a percentage. Accordingly, synchronization messages are to be transmitted, in accordance with operation 619, only when the reported ALS value (i.e., received from a sensor) is within the defined deviation amount.

Operation 1001 attempts to promote the transmitting of synchronization messages only when controller 403 is in a stable state. In the case of controlling the ambient light in a building area, a non-stable state can occur when there is a sudden change in the ambient light, such as when there is sudden cloud cover and the daylight component of a room's ambient light suddenly—and perhaps momentarily—drops, in which case it would be undesirable for the Integral control term to contribute to the output values calculated in the other controller nodes.

In accordance with operation 1003, controller 403 determines the period between transmissions of successive synchronization messages, during the stretches of time when transmissions are permitted to occur as determined in operation 1001, based on $C_{count}$ as determined in operation 611 and a network load parameter (i.e., "LOAD"). The network load parameter is defined to represent the combined volume of messages transmitted by all controller nodes per second within the defined group. In some embodiments of the present invention, controller 403 sets the period according to Equation 4:

$$Period=C_{count}/LOAD, \quad (Eq. 4)$$

wherein $C_{count}$ and LOAD are as defined above.

In some alternative embodiments of the present invention, the period is based on $C_{count}$ but not on LOAD, while in some other alternative embodiments the period is based on LOAD but not on $C_{count}$.

Controller node 301-5 can then go on to transmit one or more synchronization messages based on the period determined in accordance with operation 1003.

Figure 11:
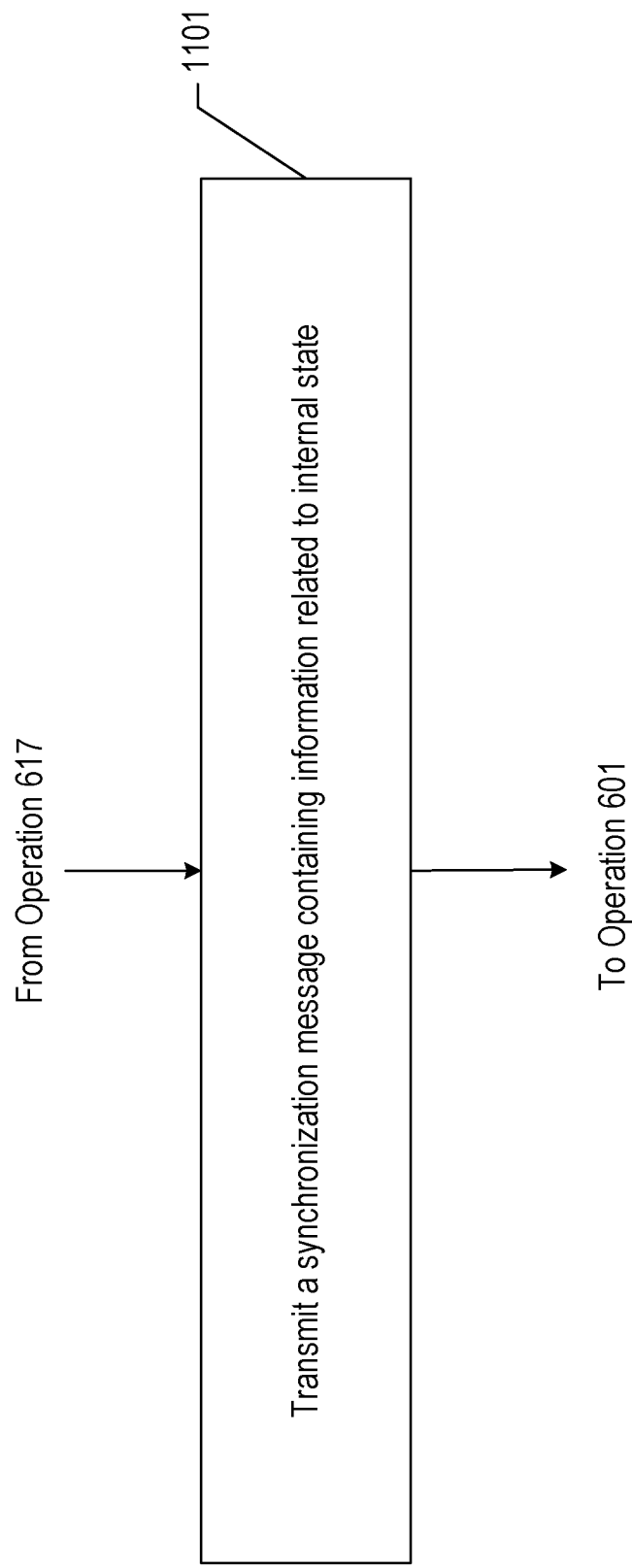
FIG. 11 depicts salient sub-operations of operation 619 of method 600.

Operations of Node 301-*m* in Transmitting a Synchronization Message:

FIG. 11 depicts salient sub-operations of operation 619, by which the luminaire performs various functions related to transmitting a synchronization message containing information about one or more internal states. Node 301-5 transmits a synchronization message containing $IS_{new}$ (i.e., the corrected value of the internal state) as determined in operation 611. In some embodiments, node 301-5 transmits a synchronization message containing IS (i.e., the previous value of the internal state). In some other embodiments, node 301-5 transmits a synchronization message containing a different variation of an internal state-related value (e.g., $IS_{corr}$, $IS_{step}$, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system that includes a plurality of data-networking nodes in a wireless mesh network, the plurality of data-networking nodes comprising a first node and a second node; wherein:

the first node comprises:
(i) a first receiver configured to receive, via the wireless mesh network, a first plurality of messages, wherein each message in the first plurality of messages contains a respective state value of a first internal state, and wherein the first plurality of messages comprises at least some of the messages in a fourth plurality of messages transmitted by the second node,
(ii) a first controller configured to generate a first plurality of correction values, including a first correction value, wherein each correction value in the first plurality of correction values is dependent on (a) the respective state value received as part of the first plurality of messages and (b) an internal state value of the first internal state of the first node,
(iii) a first lamp configured to provide light at light outputs that are dependent on the correction values in the first plurality of correction values, including the first correction value, and
(iv) a first transmitter configured to transmit, via the wireless mesh network, a second plurality of messages containing values of the first internal state that are generated by the first node, including a message that contains a first state value of the first internal state, the first state value being dependent on the first correction value; and wherein:

the second node comprises:
(i) a second receiver configured to receive, via the wireless mesh network, a third plurality of messages, wherein each message in the third plurality of messages contains a respective state value of the first internal state, and wherein the third plurality of messages comprises at least some of the messages in the second plurality of messages transmitted by the first node,
(ii) a second controller configured to generate a second plurality of correction values, including a second correction value, wherein each correction value in the second plurality of correction values is dependent on (a) the respective state value received as part of the second plurality of messages and (b) an internal state value of the first internal state of the second node, (iii) a second lamp configured to provide light at light outputs that are dependent on the correction values in the second plurality of correction values, including the second correction value, and (iv) a second transmitter configured to transmit, via the wireless mesh network, the fourth plurality of messages containing values of the first internal state that are generated by the second node, including a message that contains a second state value of the first internal state, the second state value being dependent on the second correction value.

2. The system of claim 1, wherein the first internal state is defined by an integral (I) control term.

3. The system of claim 1, wherein the first node is further configured to periodically transmit the messages in the second plurality of messages, with a transmission period that is dependent on i) the number of nodes in the plurality of data-networking nodes that are configured to provide light and ii) a network load parameter.

4. The system of claim 1, further comprising:
a sensor node configured to monitor a physical condition and to report values of the physical condition;
wherein one or more of the values of the first internal state that are generated by the first node are dependent on the values of the physical condition.

5. The system of claim 4, wherein the physical condition is ambient light level sensed by the sensor node.

6. The system of claim 4, wherein the first node is further configured to transmit the messages containing values of the first internal state, only if a value reported by the sensor node is within a predefined deviation from a predefined setpoint.

7. The system of claim 1, wherein the first correction value is further dependent on the number of nodes in the plurality of data-networking nodes that are configured to provide light.

8. The system of claim 7, wherein the first node is further configured to discover the number of nodes in the plurality of data-networking nodes that are configured to provide light, by monitoring communication in the wireless mesh network.

9. A first luminaire configured to operate in a wireless mesh network comprising a plurality of data-networking nodes, the first luminaire comprising:
a receiver configured to receive, via the wireless mesh network, a first message transmitted by another node in the plurality of data-networking nodes, the first message containing a first state value of a first internal state;
a controller configured to generate a first correction value, $IS_{corr1}$, that is dependent on (a) the first state value received in the first message, (b) an internal state value of the first internal state of the first luminaire, and (c) the number of luminaires in the plurality of data-networking nodes;
a lamp configured to provide light at a light output that is dependent on the first correction value; and
a transmitter configured to transmit, via the wireless mesh network, a first series of messages containing values of the first internal state that are generated by the first luminaire, including a second message containing a second state value of the first internal state, the second state value being dependent on the first correction value.

10. The first luminaire of claim 9, wherein the plurality of data-networking nodes comprises, in addition to the first luminaire:
a sensor node configured to monitor ambient light level and to report values of the ambient light level;
wherein one or more of the values of the first internal state that are generated by the first luminaire are dependent on the values of the ambient light level.

11. The first luminaire of claim 10, wherein the first luminaire is further configured to transmit the messages containing values of the first internal state, only if a value reported by the sensor node is within a predefined deviation from a predefined setpoint.

12. The first luminaire of the claim 9, wherein the first internal state is defined by an integral (I) control term.

13. The first luminaire of claim 9, wherein the first luminaire is further configured to discover the number of luminaires in the plurality of data-networking nodes by monitoring communication in the wireless mesh network.

14. The first luminaire of claim 9, wherein the first luminaire is further configured to periodically transmit the messages containing values of the first internal state, with a transmission period that is dependent on i) the number of luminaires in the plurality of data-networking nodes and ii) a network load parameter.

15. A method for operating a first luminaire in a wireless mesh network comprising a plurality of data-networking nodes, the method comprising:
receiving, via the wireless mesh network, a first message transmitted by another node in the plurality of data-networking nodes, the first message containing a first state value of a first internal state;
generating a first correction value, $IS_{corr1}$, that is dependent on (a) the first state value received in the first message, (b) an internal state value of the first internal state of the first luminaire, and (c) the number of luminaires in the plurality of data-networking nodes;
providing light, via a lamp, at a light output that is dependent on the first correction value, and
transmitting, via the wireless mesh network, a first series of messages containing values of the first internal state that are generated by the first luminaire, including a second message containing a second state value of the first internal state, the second state value being dependent on the first correction value.

16. The method of claim 15, further comprising:
monitoring ambient light level, via a sensor node that is in the plurality of data-networking nodes; and
reporting, via the sensor node, values of the ambient light level;
wherein one or more of the values of the first internal state that are generated by the first luminaire are dependent on the values of the ambient light level.

17. The method of claim 16, wherein the transmitting of the messages containing the values of the first internal state occurs only if a value reported by the sensor node is within a predefined deviation from a predefined setpoint.

18. The method of claim 15, wherein the first internal state is defined by an integral (I) control term.

19. The method of claim 15, further comprising discovering the number of luminaires in the plurality of data-networking nodes by monitoring communication in the wireless mesh network.

20. The method of claim 15, wherein the transmitting of the first series of messages occurs in accordance with a transmission period between successive messages in the first series that is dependent on i) the number of luminaires in the plurality of data-networking nodes and ii) a network load parameter.

* * * * *